(12) United States Patent
Knorr et al.

(10) Patent No.: US 10,775,763 B2
(45) Date of Patent: Sep. 15, 2020

(54) PROCESSING MACHINE AND METHOD FOR PROCESSING WORK PIECES

(71) Applicant: HOMAG GmbH, Schopfloch (DE)

(72) Inventors: Wolfgang Knorr, Hirrlingen (DE); Manuel Friebolin, Calw-Stammheim (DE); Joachim Graf, Voehringen (DE)

(73) Assignee: HOMAG GmbH, Schopfloch (DE)

( * ) Notice: Subject to any disclaimer, the term of this patent is extended or adjusted under 35 U.S.C. 154(b) by 154 days.

(21) Appl. No.: 15/763,824

(22) PCT Filed: Jul. 27, 2016

(86) PCT No.: PCT/EP2016/067894
§ 371 (c)(1),
(2) Date: Mar. 27, 2018

(87) PCT Pub. No.: WO2017/059980
PCT Pub. Date: Apr. 13, 2017

(65) Prior Publication Data
US 2018/0259931 A1 Sep. 13, 2018

(30) Foreign Application Priority Data
Oct. 6, 2015 (DE) .......................... 10 2015 219 257

(51) Int. Cl.
*G05B 19/19* (2006.01)
*B27D 5/00* (2006.01)
(Continued)

(52) U.S. Cl.
CPC ............... *G05B 19/19* (2013.01); *B23C 3/12* (2013.01); *B27D 5/006* (2013.01);
(Continued)

(58) Field of Classification Search
None
See application file for complete search history.

(56) References Cited

U.S. PATENT DOCUMENTS

2018/0043385 A1* 2/2018 Le Strat .................. B05D 1/02

FOREIGN PATENT DOCUMENTS

DE 19741163 A1 4/1999
DE 602004002794 T2 8/2007
(Continued)

OTHER PUBLICATIONS

Machine Translation of DE-102012202503-A1 (publication date Aug. 2013).*

(Continued)

*Primary Examiner* — Ryan A Jarrett
(74) *Attorney, Agent, or Firm* — Morgan, Lewis & Bockius LLP

(57) ABSTRACT

The invention relates to a processing machine (10) or method for processing substantially plate-shaped work pieces (W), preferably made at least partially from wood, wood materials, composite materials or plastics, wherein the processing machine (10) has a processing device (6) for processing a work piece (W) in a processing direction (R), an optical detection device (2), an evaluation unit and a control device (4), wherein: the optical detection device (2) is designed and configured in such a way that it can optically detect front and rear (in relation to the processing direction (6)) end sections (Q1, Q2) of a work piece (W) to be processed, and it provides the evaluation unit with corresponding detection results; the evaluation unit is designed in such a way that it assesses, based on the detection results, whether a coating (B) is present on the front and/or rear end section (Q1, Q2) of the work piece (W) to be processed, and provides the control device (4) with corresponding assessment results; and the control device is designed in such a way that it controls the further processing of the work piece (W) to be processed via the processing device (6) on the basis of the assessment results.

17 Claims, 3 Drawing Sheets

(51) Int. Cl.
    *B23C 3/12*    (2006.01)
    *B29C 63/00*   (2006.01)
(52) U.S. Cl.
    CPC ............... *B29C 63/0026* (2013.01); *G05B 2219/36221* (2013.01); *G05B 2219/45229* (2013.01)

(56) References Cited

FOREIGN PATENT DOCUMENTS

| | | | |
|---|---|---|---|
| DE | 102012202503 A1 | * | 8/2013 |
| EP | 1464470 A2 | | 10/2004 |
| EP | 2308659 A1 | | 4/2011 |

OTHER PUBLICATIONS

Human translation of DE 102012202503 A1 (publication date Aug. 22, 2013).*

* cited by examiner

PROCESSING MACHINE AND METHOD FOR PROCESSING WORK PIECES

FIELD OF THE INVENTION

The present invention relates to a processing machine and a method for processing substantially plate-shaped work pieces, particularly for the furniture industry.

TECHNICAL BACKGROUND OF THE INVENTION

Processing machines for plate-shaped work pieces in which the work pieces are conveyed through a conveyor system and then undergo processing by a processing device which is arranged alongside the conveying route are known from the prior art. EP 1 464 470 A2 may be referred to as an example.

Such machines have undergone further development in recent years to such an extent that it has been possible to increase the processing or throughput speeds more and more. Here, however, it should be noted that the end user frequently does not use the machine to process runs of the same work pieces, but rather feeds in a variety of work pieces as required and prepared. These differences relate not only to the shape of the work pieces, but in particular also to the edge materials (or coatings) which have been applied in particular to the narrow or side faces of the work piece in a possible previous processing step.

In order to ensure a pleasing appearance in the finished work piece, this edge material must be taken into consideration for the further processing of the work piece in a processing machine. Thus, for example, "thick edges" require different processing than "thin edges". Inadequate or insufficient consideration of these influencing factors results in rejects.

In this regard, the state of the art suggests mechanical sampling of the neuralgic areas of the work piece for further processing, among other things. As an alternative, the storage of the relevant data under a code which is applied to the work piece and is then read accordingly by the processing machine is known. However, both measures are prone to error, particularly at high machine rates, and are labour-intensive to implement in practice.

EP 1 464 470 A2 suggests a machine in which the opto-electronic devices are used for imaging acquisition of the narrow side profiles. The corresponding profiles of the edges are then reconstructed at least approximately through appropriate image processing and analysis. This, according to EP 1 464 470 A2, allows commands for trimming of protruding edge material in the form of so-called cutting trajectories to be issued to a respective processing device.

Even such methods reach their limits if the processing speed is to be further increased. The acquisition of an image in the form of a type of data cloud, its processing and the calculation of the complete profile is a very complex undertaking which unavoidably takes a certain amount of processing time. At the desired conveyor speeds of multiple metres per minute, this is no longer practical because the data processing is simply no longer able to keep up with the machine cycle.

DESCRIPTION OF THE INVENTION

Consequently, an object of the present invention is to provide a processing machine and a corresponding method for processing substantially plate-shaped work pieces with which the occurrence of rejects can be reduced while at the same time increasing the processing speeds.

The object is achieved with a processing machine according to claim 1 and a method according to claim 14.

The basic concept of the present invention is initially just to determine whether a coating has been applied on a given narrow face of the work piece or not, and to use this result to control the further processing. In a further step, if a coating is present, further properties of the coating which are then communicated to the machine controls in an appropriate manner and used within the machine to control the processing sequence and to control and regulate downstream processes can be determined.

In particular, a processing machine for processing substantially plate-shaped work pieces which are preferably made at least partially from wood, wood materials, composite materials or plastic comprises: a processing device for processing a work piece in a machining direction, an optical detection device, an evaluation unit and a control device.

Here, the optical detection device is designed and arranged such that it can optically detect the front and rear end sections, in relation to the machining direction, of a work piece to be processed and provide the evaluation unit with the corresponding detection results. The evaluation unit is designed such that it uses the detection results as a basis for analysis of whether there is a coating on the front and/or read end sections of the work piece to be processed, and provides the control device with the corresponding analysis results. Furthermore, the control device is designed such that it controls the further processing of the work piece to be processed by the processing device based on the analysis results.

The processing device may comprise multiple processing units. Control of the further processing of the work piece to be processed can include the selective activation or deactivation of processing units within the processing device and/or appropriate control of the effect of processing units on the work piece (e.g. in the form of processing trajectories, the tool performance used, the duration of exposure, etc.) and/or the substitution of certain processing units in the processing device.

By providing the optical detection device, the evaluation unit, and the control device, it becomes possible to control the processing of a work piece by the processing device depending on whether there is a coating on the front and/or rear end section of the work piece to be processed or not. As a result, the further processing by the processing device can be adapted to suit the properties of the rear/front end sections, thereby improving the processing result.

Furthermore, incorrect settings on the machine in which an incorrect condition of the front and/or rear end section is assumed can be avoided. As a result, the rejection rate during processing of the work pieces can be reduced.

Because the evaluation unit initially only analyses whether there is a coating or not, complex image processing with high computing power is unnecessary and the corresponding analysis results are quickly available to the control device, allowing the throughput to be increased on the processing machine.

Consequently, a processing machine is generally provided in which the occurrence of rejects is reduced and, at the same time, a high processing speed can be achieved. Because the machine is enabled to make autonomous decisions regarding further processing steps, the machine operation can furthermore be simplified. Moreover, the effort for the operating personnel (program creation) is reduced and process reliability is increased.

Here, the coating can be glued on edging material, laminating or film material, wrapping or an edge strip, for example. The front or rear end sections can be side surfaces or edges of the work piece which are attached to the main surface of the work piece. The front and rear end sections preferably run transverse to the machining direction.

According to a preferred embodiment, the processing device has multiple processing units, and the control device is designed such that further processing of the work piece is controlled such that it controls at least one processing step by at least one processing unit and in particular prevents at least one processing step if there is no coating on the front and/or rear end section of the work piece to be processed.

As a result, the case in which specific finishing work on a work piece must be adjusted or omitted entirely in the absence of a coating can be taken into account while maintaining a fast machine cycle. Here, an example might be a milling unit as a processing unit which should create a rounding or bevel on the work piece, depending on whether there is a coating on the front and/or rear end section or not. Through the appropriate control of the at least one processing unit, it is consequently possible to adjust the effect of the processing machine individually and in real time to suit the respective work piece, meaning that the effort on the part of the operating personnel and the rejects are further reduced.

According to a preferred embodiment, the evaluation unit is furthermore designed such that, in the event that there is a coating on the front and/or rear end section of the work piece to be processed, it determines the material thickness of the corresponding coating from the detection results and provides the control device with the material thickness determined.

Here, the control device is designed such that it controls the further processing of the work piece to be processed by the processing device based on the material thickness determined.

Because the material thicknesses are only determined if there is a coating, processing time can be saved in analysis and control, allowing for rapid processing. At the same time, the processing can be even better adjusted to the corresponding work piece owing to the consideration of the material thicknesses, which further reduces rejects.

According to a preferred embodiment, the evaluation unit is furthermore designed such that it determines further parameters of the coating from the detection results and provides these to the control device, wherein the control device is further designed such that it controls the further processing of the work piece to be processed by the processing device based on the further parameters.

Because the further parameters are only determined if there is a coating, a significant time saving can be achieved particularly in comparison with methods in which the entire contour of an end section is calculated as standard. Owing to the fact that the further control is then based on this finite number of further parameters (instead of a point cloud representing the contour), a significant reduction in the volume of data to be communicated and a quicker processing can be achieved.

Preferably, the further parameters include the transition radii from the corresponding coating to the work piece to be processed and/or the transition bevels of the corresponding coating to the work piece to be processed and/or the thickness of the work piece to be processed.

Using these parameters, it is possible to characterise the coating for the purposes of further processing. Even if all of these parameters are taken into account here, the parameter set per coating only includes very few parameters which can be transformed by the control device into control commands for the processing device with minimum effort. The data itself can simply be read from the detection results for the optical detection device and in particular do not require any CPU-intensive filtering out of individual points representing the contour of the edges from an image.

As a further development, it is also conceivable that the control commands for controlling the processing device which correspond to the parameters determined have already been saved in an electronic allocation table in the memory for the control device, whereby only allocation to the values in the allocation table is required for appropriate control of the processing device, and not recalculation of the control commands (e.g. in the form of cutting trajectories).

According to a preferred embodiment, the evaluation unit is furthermore designed such that, if there is a coating on the front and/or rear end section of the work piece to be processed, it determines the material thickness for the corresponding coating, compares the material thickness determined with a predefined threshold value, and only determines the further parameters if the threshold value is exceeded.

As a result, determination of the parameters can be reduced to the area of application in which the determination of the parameters is actually required. For material edges which fall below a certain material thickness, the transition radii or transition bevels, for example, are so indistinct that processing which is adjusted accordingly is unnecessary. For higher material thicknesses, however, this can certainly be necessary in order to achieve a pleasing appearance in the processed work piece. A high processing speed through the machine can be ensured through the choice made depending on the material thickness.

According to a preferred embodiment, the processing device furthermore comprises multiple processing units, and the evaluation unit is designed such that, if there is a coating on the front and/or rear end section of the work piece to be processed, it determines the material thickness for the corresponding coating, compares the material thickness determined with a predefined threshold value, and controls the further processing such that it controls at least one processing step by at least one processing unit and in particular prevents at least one processing step if the material thickness for the corresponding coating falls below the threshold value.

As a result, it is possible to selectively react to the condition of the coating and in particular to its material thickness. Operating errors on the machine can be further reduced as a result.

According to a preferred embodiment, the optical detection device in the processing machine is arranged such that it detects the front and/or rear end section of the work piece to be processed in a projection on a plane which is substantially parallel to the machining direction and vertical to at least one main surface of the work piece to be processed.

With this configuration, it is possible to ensure that the properties of any coating which may be present on the front and/or rear end sections which are relevant for further processing can be reliably detected. In other words, the detection device thus detects an image area which corresponds to the profile of the coating (without the profile being measured). Consequently, the evaluation unit is easily able to infer the presence or absence of a coating and any parameters of the coating in a subsequent analysis of the detection results.

Particularly preferably, the front and/or rear end sections of the work piece to be processed run transverse to the machining direction and the "line of sight" of the optical detection device is substantially oriented towards the sides of the work piece which run in the machining direction.

This embodiment thus allows for reliable detection of the coating.

According to a preferred embodiment, the processing machine further comprises a conveyor system for conveying the work piece to be processed in a conveying direction, wherein the conveyor system is parallel to the machining direction. Conveying occurs with continuous processing and the conveying speed is less than 200 m/min, preferably between 5 m/min and 150 m/min and particularly preferably between 15 m/m and 50 m/min.

Through conveying with continuous processing, very high numbers of cycles can be achieved. This works together in an advantageous manner with the embodiment of the machine described above with regard to the optical detection device, as well as the evaluation unit and the control device, which are likewise designed for rapid data processing. This particularly concerns the analysis of the detection results by the evaluation unit, reduced to a few relevant points.

According to a preferred embodiment, the optical detection device has two sensing devices which are arranged one after another in the machining direction.

This allows for separate detection of the front and rear end sections of the work piece to be processed, for example, and thus for even quicker and more precise detection of the qualities of the work piece which are relevant for further processing.

According to a further preferred embodiment, the optical detection device can comprise a pair of two optical sensing devices as an alternative or in addition to it which are located opposite one another over the work piece to be processed in a direction vertical to the machining direction.

Detection of the front and rear end sections of the work piece to be processed can thus occur from both sides in the machining direction. The processing can consequently react to any differences between the two sides of the work piece, thus further improving the processing result.

This is advantageously to be combined with a processing device which (in relation to the machining direction) is suitable for processing on both sides of the work piece.

According to a preferred embodiment, the optical detection device is an imaging system.

This allows for technically simple implementation of the optical detection of the front and rear end sections of the work piece and ensures easy analysis of the detection results. Thus, for example, colour or grey values can be read from the detection result and converted into the desired information.

As an alternative to this, sampling with the beams from a radiation source, such as a laser, and the measurement of the beams reflected on the work piece is conceivable.

According to a preferred embodiment, the processing machine furthermore has a sensor device for detecting position data, in particular a position and/or length, of the work piece to be processed which provides corresponding position detection results to the control device, wherein the processing machine is furthermore designed such that the optical detection of the front and rear end sections of the work piece to be processed by the optical detection device is activated based on the position detection results of the sensor.

In particular, the processing machine is designed such that the detection results are only determined if it can be inferred based on the position detection results, in particular the position and/or length of the work piece to be processed, that the detection area of the optical detection device contains the front or rear end section of the work piece. This reduces the volume of data which accrues and consequently reduces the time required in order to analyse it. Furthermore, detection matched with the position or length of the work piece guarantees an accurate detection result.

In addition, it is preferred that the control device is designed such that the further processing of the work piece to be processed by the processing device is controlled by the control device based on the position detection results, which is beneficial for accurate processing.

According to preferred embodiments, the evaluation unit is either integrated directly into the optical detection device or into the control device.

Both solutions constitute effective methods of rapidly processing the data collected and integrating it into the further control of the machine. If the evaluation unit is integrated into the optical detection device, the control device is thus only provided with the analysis results, meaning that the computing power arising in the control device can be reduced. Particularly where the detection device has multiple sensing devices and the evaluation unit is respectively arranged on the sensing devices, parallel processing of the detection results can thus occur, saving processing time. With integration into the control device, it is possible to fall back of control device architecture which optionally makes it possible to use more computing power for the analysis of the detection results. This can also speed up the processing of the detection results where applicable.

A method for processing substantially plate-shaped work pieces which are preferably made at least partially from wood, wood materials, composite materials or plastic using a processing machine which comprises an optical detection device and a processing device for processing a work piece in a machining direction is described below. The method comprises the following steps: optical detection of the front and rear end sections of the work piece to be processed in the machining direction for the generation of corresponding detection results using the optical detection device; evaluation of whether there is a coating on the front and/or rear end sections of the work piece for the generation of corresponding analysis results, wherein the evaluation occurs through analysis of the detection results; and control of the further processing of the work piece by the processing device based on the analysis results.

Control of the further processing based on the analysis results can, for example, include a decision as to whether a certain processing method (which is optionally carried out with a certain processing unit) is applied or not. In addition, controlling variables for a processing method can be adjusted to control the further processing.

Using the method described, the further processing of the work piece can be performed based on an evaluation of whether there is a coating on the front and/or rear end sections, which improves the processing result and increases process reliability. Because, initially, only an evaluation of whether there is a coating or not is performed, the analysis of the detection results can furthermore be simplified, which allows the method to be conducted with a rapid rate of the steps of the method.

Furthermore, the processing of the work piece is individually adjusted to suit the properties of the individual work piece. The method is thus more manageable and, at the same time, ensures a reduction in the rejects.

According to a preferred embodiment of the method, processing of the work pieces occurs continuously with the work pieces conveyed at a speed of less than 200 m/min, preferably between 5 m/min and 150 m/min and particularly preferably between 15 m/min and 50 m/min.

According to a preferred embodiment of the method, the optical detection of the front and rear end sections of the work piece to be processed occurs in a projection on a plane which is substantially parallel to the machining direction (or, for conveying with continuous processing, parallel to the conveying direction) and vertical to at least one main surface of the work piece to be processed.

This guarantees reliable detection of the front and rear end sections and thus effective evaluation of whether there is a coating on the front and rear end sections or not. Furthermore, this permits easier analysis of the detection results, which favours a faster progression of the steps of the method.

According to a preferred embodiment of the method, the method furthermore comprises the steps: determining the material thickness for the coating on the front and/or rear end section of the work piece to be processed through analysis of the detection results if the presence of a coating on the corresponding end section of the work piece to be processed was identified in the evaluation step, and control of the further processing of the work piece by the processing device based on the material thickness determined.

Similar to the device outlined above, appropriate and efficient determination and evaluation can be achieved as a result. Control based on the material thickness determined can mean, for example, that individual processing methods carried out by the processing device are adjusted or suspended if the material thickness determined demonstrates a certain value.

According to a preferred embodiment of the method, the following steps are furthermore provided: comparison of the material thickness determined with a predefined threshold value and, if the material thickness determined exceeds the predefined threshold value, determination of further parameters for the corresponding coating through evaluation of the detection results and control of the further processing of the work piece by the processing device based on the further parameters.

Steps of the method which, for example, would be superfluous for a material thickness below a predefined threshold value can thus be foregone, which further increases the efficiency of the method. On the other hand, optionally relevant parameters can nevertheless be included in the control of the further processing. The transition radius between the coating and the main surfaces of the work piece may be given as an example here. If it is determined that the material thickness of a coating present on an end section exceeds the predefined threshold value (i.e. it is a thick edge, for example), the transition radius, for example, can be evaluated as a further parameter. The further control of the processing of the work piece can be adjusted to suit this transition radius so that an even appearance is achieved on the work piece in particular in the joint area of the coating.

DETAILED DESCRIPTION OF PREFERRED EMBODIMENTS OF THE INVENTION

Preferred embodiments of the present invention are described in detail below with reference to the accompanying drawings. Further modifications specified in this connection can always be combined with one another in order to form new embodiments.

Figure 1:
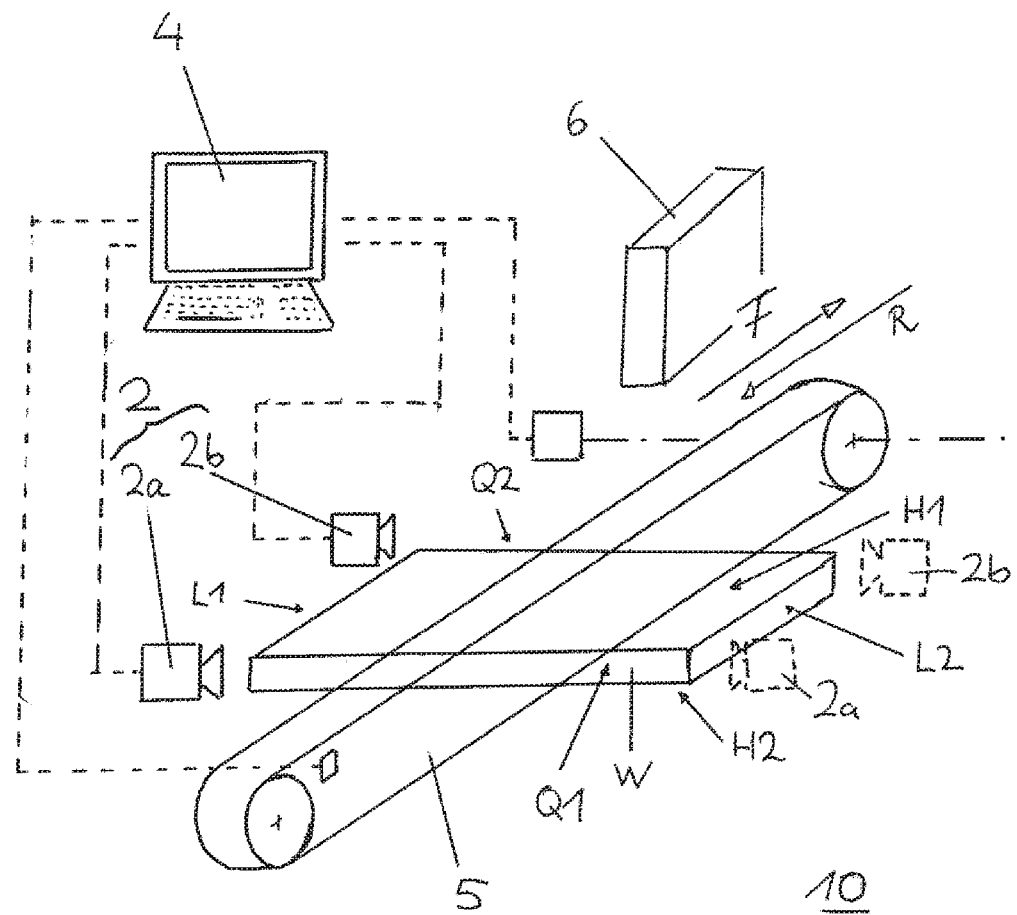
FIG. 1 shows a schematic perspective view of a processing machine according to an embodiment.

FIG. 1 shows an embodiment of a processing machine 10 in a simplified perspective view. Here, the processing machine 10 is suitable for the processing of substantially plate-shaped work pieces W.

A flat panel with two main surfaces H1 and H2, two longitudinal sides L1 and L2, and two transverse sides Q1 and Q2 is shown in the drawing by way of an example as work piece W. The longitudinal and transverse sides are the narrow edges of the work piece W.

In the processing machine 10, the work piece W is conveyed with continuous processing by a conveyor system 5 in a conveying direction F. In the process, conveying preferably occurs such that the longitudinal sides L1 and L2 substantially extend in the conveying direction F. The work pieces W are conveyed by the conveyor system 5 to a processing device 6, where in particular processing of the longitudinal sides L1 or L2 takes place. The processing device 6 may have multiple processing units, not shown, for this.

In the processing machine 10, processing of the work piece W by the processing device 6 should be adjusted for a coating B (here in particular edging material) optionally present on the transverse sides Q1 and Q2.

The coating B may have a variety of properties here. In order to achieve a particularly high quality appearance in the finished product, the thickness D of the coating B and its behaviour in the transition to the main surfaces H1 and H2 are particularly relevant with regard to further processing by the processing device 6. Here, any transition radius existing for coating B or a transition bevel for coating B at the transition to the main surfaces H1 and H2 of the work piece W is particularly important. These properties of the coating B thus define whether and to what extent milling processing should be performed on the work piece W or the coating on the transverse side Q1 and Q2, as well as an (optionally still to be applied) coating on the narrow sides L1 and L2 in order to achieve a high quality look and feel. Since the perception of a finished work piece is primarily determined by the development of the transition areas (i.e. between the main surfaces and narrow edges and the coating), the other areas of the profile of the coating, in particular the section between the joint to other sections of the work piece are of lesser importance.

With regard to quick and reliable processing of the work pieces, the processing machine 10 establishes the properties of the coating which are particularly relevant for further processing and leaves less relevant aspects out. Consequently, detection of the complete profile of the coating B is foregone.

Figure 2:
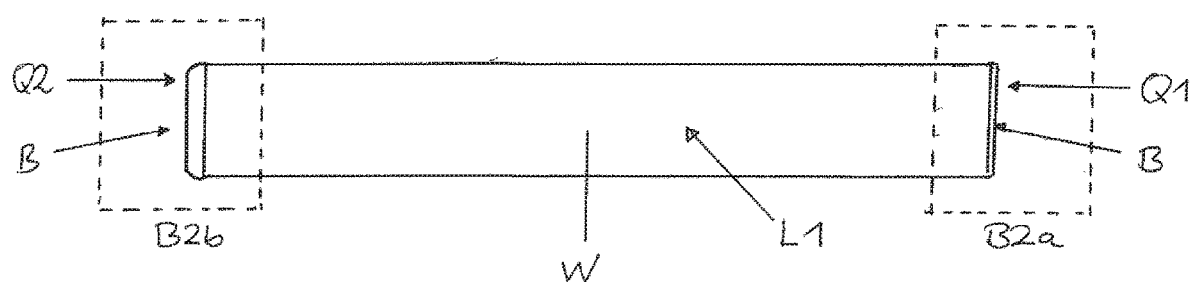
FIG. 2 shows a detail view of a side edge of a work piece conveyed in the processing machine.

The processing machine 10 has an optical detection device 2. In the embodiment shown, the detection device 2 has two optical sensing devices 2a and 2b, which are arranged along the conveying direction F one after another on the conveying route for the work piece W conveyed. The sensing devices 2a and 2b are arranged such that they are oriented towards the longitudinal side L1 of the work piece W. They are thus able in particular to detect the front and rear end sections (here the transverse sides Q1 and Q2) of the work piece conveyed in a projection on a plane which is substantially parallel to the conveying direction F and vertical to at least one main surface H1, H2 of the work piece W conveyed. They are thus oriented towards the longitudinal sides L1 and L2 and can detect the longitudinal sides Q1 and Q2 "in profile" (see FIG. 2).

Here, there is an optical sensing device 2a, 2b for each of the two transverse sides Q1 and Q2. The sensing device 2a should detect the rear transverse side Q1 in particular here, while the sensing device 2b should detect the front transverse side Q2. However, it is also conceivable for the optical detection device 2 to only be equipped with one optical sensing device which then detects the front and rear transverse edges Q1 and Q2 one after the other.

Figure 3A:
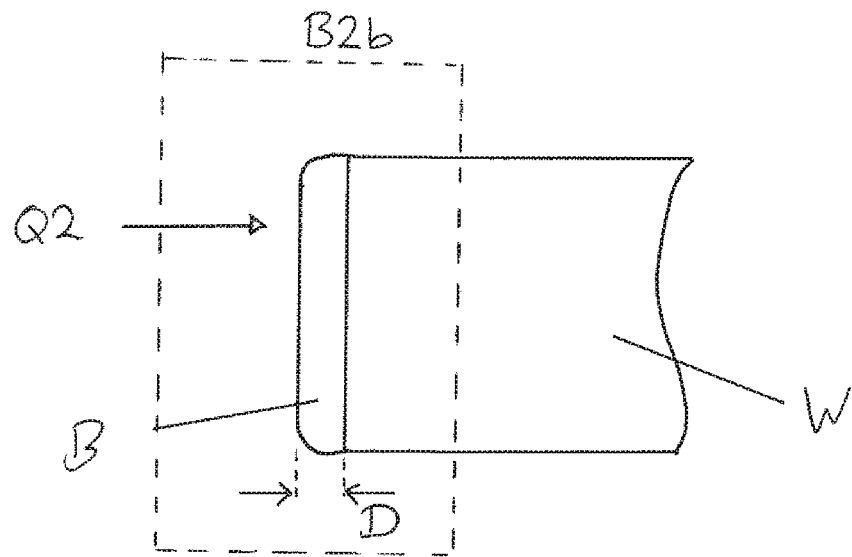
FIGS. 3a and 3b show the front and rear end sections of a work piece and the corresponding detection zones of optical detection devices in the processing machine in detail.
Figure 3B:
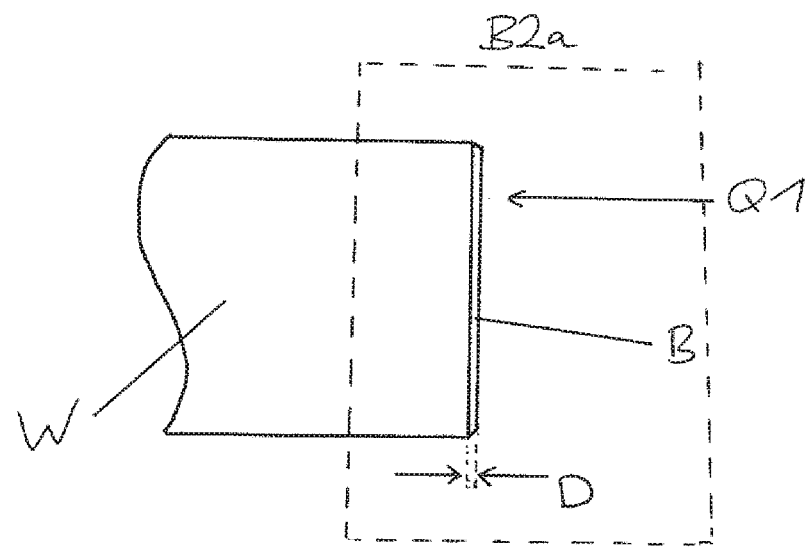

The optical detection device 2 is preferably an imaging system. The image areas B2a and B2b for the optical sensing devices 2a and 2b of the optical detection device 2 are outlined in FIGS. 2, 3a, and 3b. As can be seen from these drawings, the image areas for the optical sensing devices 2a and 2b each cover part of the longitudinal side L1 and the transverse sides Q1, Q2 in profile. If the optical detection device 2 is an imaging system, it images the image areas and provides the image data thus generated as detection results.

The processing device 6 has multiple processing units, not shown, which may include milling units or edge stripping units, as well as edge banding units (for the longitudinal sides), for example.

Furthermore, the processing machine 10 has a control device 4 which is connected to the optical detection device 2 and the processing device 6 (for example via a cable connection or a wireless network). Here, the control device 4 is in particular suitable for appropriately controlling the processing device 6, and in particular for adjusting, activating, or deactivating individual processing units within the processing device 6.

In addition, the processing machine 10 has an evaluation unit which is not explicitly shown in the drawings. The evaluation unit can be integrated into the optical detection device 2 or the control device 4. Either way, it is connected to both so that it can receive the detection results from the optical detection device 2 and can pass the analysis results on to the control device 4.

In the interests of a fast processing speed and a high throughput through the processing machine 10, complete image analysis of the image areas 2a and 2b (in order to fully extract the profile of the transverse edges or the coating B applied to them, for example) is not performed during generation of the analysis results in the evaluation unit. The evaluation unit is rather designed such that it initially only evaluates, based on the detection results, whether there is a coating B on the front and/or rear end sections (i.e. the transverse sides Q1 and Q2) of the work piece W conveyed. These analysis results are then provided to the control device 4.

The control device 4 is designed such that it controls the further processing of the work piece W conveyed by the processing device 6 based on these analysis results.

To this end, it can, for example, activate or deactivate at least one of the processing units and/or adjust the scope of processing for the processing units.

If, for example, the processing device 6 should in particular process the joint area between the transverse and longitudinal sides (i.e. the corner area) of the work piece W in order to match the longitudinal sides L1 and L2 to a possible coating B on the transverse sides Q1 and Q2, the following scenario is conceivable: the evaluation unit determines that there is no coating B on the transverse sides Q1 and Q2, so the control device 4 can control the processing device 6 such that processing to this effect by a corresponding processing unit does not take place. If the presence of a coating B on one of the transverse sides Q1 or Q2 is determined, the control device 4 can activate appropriate processing by a corresponding processing unit.

In order to assist the optical detection of the front and rear end sections of a work piece W conveyed, the processing machine 10 furthermore has a sensor device 1, 3 which is particularly suitable for determining the position or the length of the work piece in the conveying direction F.

Here, the sensor device 1, 3 is comprised of an occupancy switch 1 and a rotary encoder 3. The occupancy switch 1 is actuated when it is occupied by the work piece W. The rotary encoder 3 emits a number of pulses to the conveyor system 5. In conjunction with the occupancy switch 1 and the rotary encoder 3, it is therefore possible not only to estimate the position of the front end section of the work piece on the conveying route F, but also to detect the length of the work piece W. This can occur so that the number of pulses from the rotary encoder 3 is incremented when occupancy of the occupancy switch 1 is detected. This information (also known as the position detection results) can then be used by the control device 4 for activation of the optical detection device 2 and for appropriate and precise processing of the work piece W by the processing device 6, for example.

Because the evaluation unit initially only uses the detection results to evaluate whether there is a coating B on the corresponding transverse side Q1 or Q2, the computing power used in the analysis of the detection results can be significantly reduced, whereby the process times can be significantly reduced.

Rapid analysis is possible in an imaging system in this regard by means of colour or grey values, for example. If the colour or grey value in the image area changes in connection with the work piece W in comparison with the background or work piece, then the presence of a coating can be inferred, for example. The computing power required for such an evaluation is very low.

Furthermore, the design of the processing machine 10 allows the analysis of the detection results to be refined step by step.

Here, these refinement steps only occur if a coating B has been detected.

As a next step, for example, the material thickness D of the coating B can be determined. This is also an evaluation step which requires comparatively little computing power. Based on the material thickness D determined, further processing can be adjusted accordingly by the control device 4.

Furthermore, the analysis of the material thickness D by the evaluation unit and its transfer to the control device 4 makes it possible to differentiate between a thick or thin coating B (i.e. between a thick edge or a thin edge). This differentiation can be important for some applications since special processing is required depending on the presence of a thin or thick coating B.

So, for example, it is conceivable that some processing steps which are absolutely essential for achieving a pleasing appearance with a thick edge are not performed at all if there is a thin edge. Here, it would be conceivable that a rounding or bevelling of the corner area and the transition area to the main surfaces H1 and H2 of the work piece W is omitted if there is a thin edge, while this might well be performed with a thick edge.

Furthermore, the threshold values can be used to determine whether further parameters should be detected for the coating B, for example, in order to improve the further processing by the processing device 6 accordingly. Thus, if the threshold value is exceeded from the detection results, then the evaluation unit can detect the thickness of the work piece itself and the transition radii and/or the transition bevels from the coating B to the work piece W conveyed, for example. In the latter case, the process concentrates on the transition area between the coating and the work piece, which significantly simplifies the evaluation of the detection results in comparison with complete reading of the profiles of the coating in the form of a point cloud.

Using the parameters detected, the control device 4 can adjust the further processing by the processing device 6 accordingly. For example, it can determine, using the transition radii determined, whether and in what form rounding of adjoining surface elements and the corner area of the work piece W is necessary. To this end, the appropriate processing units in the processing device 6 can then be switched on or activated. Furthermore, their contact pressure and their direction can be adjusted accordingly.

Because the evaluation unit only determines whether there is a coating or not and then optionally determines further specific data from the detection results, during analysis the focus is on the relevant parameters, which are additionally only determined as required. In comparison to a complete analysis of the profile of the transverse sides Q1 and Q2 of a work piece W, a great deal of time can be saved.

The processing machine 10 dispenses entirely with the calculation of such a profile. Even if there is a thick edge, only the transition radii or transition bevels at the transition between the thick edge and the work piece W conveyed are determined, for example. The properties of the coating B which are essential for further processing can by condensed into a few parameters in an efficient manner (coating yes/no; material thickness of the coating, radius at the transition to the work piece, bevel at the transition to the work piece).

Since the analysis of the work piece W is no longer a limiting factor in the processing of the work piece W, the machine rate can be significantly increased. Thus, conveying speeds in the order of 100 m/min, preferably 5 m/min to 150 m/min, in particular in the range from 15 m/min to 50 m/min, and sometimes even speeds of up to 200 m/min are thus conceivable with the embodiment shown.

The following modifications in particular are conceivable on the processing machine 10.

In the embodiment shown in FIG. 1, a conveyor system 5 which transports the work pieces W in a conveying or throughput direction F is provided. The machining direction R through the processing device is thus (as a result of the transportation of the work pieces W past the processing device 6) parallel to the conveying direction F and opposite to it.

As an alternative design, it is also conceivable to affix a processing device to a gantry which can be moved relative to a conveying direction or to a work piece W held stationary. Here, it simply should be noted that detection of the transverse sides of the work piece should occur before processing of the work piece by the processing device.

If, for example, the processing device is arranged on a gantry, the optical detection device is upstream from the processing device in the machining direction. This is also possible, for example, through arrangement of the optical detection device before the processing device on the gantry.

Alternatively/additionally, both the processing device and the optical detection device can be arranged on separate moveable tool carrier devices (in particular booms) which can be moved relative to the work piece. Here too, care must be taken to ensure that optical detection of the transverse sides of the work piece can occur before processing by the processing device.

The drawing of FIG. 1 shows a processing machine 10 in which the processing device 6 and the optical detection device 2 are arranged on one side of the conveying route. I.e. processing of the work piece W is done on one of the longitudinal sides L1 of the work piece W. Alternatively, processing can of course also be done on both sides. To this end, the processing device 6 can have processing units which are arranged on both sides of the work piece W, i.e. on both sides of the conveyor system 5.

This design can be supplemented by the provision of pairs 2a, 2a and 2b, 2b of optical sensing devices within the optical detection device, wherein a pair 2a, 2a of optical sensing devices are then opposite one another over the conveying route for the work piece conveyed in a direction vertical to the conveying direction.

As a whole, there may be any desired number of optical sensing devices within the optical detection device 2 and the number can in particular be adjusted to suit the specific area of application. Thus, for example, very good results can be achieved even with one optical sensing device. Alternatively, the optical detection device can also have two optical sensing devices 2a and 2b, or one or more pairs of optical sensing devices 2a, 2a and 2b, 2b.

The processing machine 10 was illustrated using a substantially cuboid work piece W which has two main surfaces H1 and H2, two transverse sides Q1 and Q1, and two longitudinal sides L1 and L2. Of course, the use of the processing machine 10 and the corresponding method are not limited to the processing of such work pieces. As long as the front and rear end sections of the work piece conveyed can be detected, the processing machine 10 is also suitable for the processing of work pieces which run asymmetrically in any forms.

The optical detection device was preferably described as an imaging system in which the front and/or rear end sections of the work piece are detected within the mapping or image area of the optical sensing devices as an image. However, the optical sensing devices can also be understood to include non-imaging systems in which, for example, the reflection of a laser beam or other suitable sources is used in order to determine the presence or absence of a coating, as well as its thickness.

The invention claimed is:

1. A processing machine for processing of substantially plate-shaped work pieces which are made at least partially from a group consisting of wood, wood materials, composite materials and plastic, wherein the processing machine comprises:
    a processing device having multiple processing units for processing a work piece in a machining direction;
    an optical detection device;
    an evaluation unit; and
    a control device,
    wherein
    the optical detection device is designed and arranged such that it can optically detect the front and rear end sections, in relation to the machining direction, of a work piece to be processed and provide the evaluation unit with the corresponding detection results,
    the evaluation unit is designed such that it evaluates, based on the detection results, whether there is a coating on the front and/or rear end section of the work piece to be processed, and provides the control device with corresponding analysis results, the control device is designed such that it controls the further processing of the work piece to be processed by the processing device based on the analysis results, and the control device is furthermore designed such that it controls the further processing such that it controls at least one processing step by at least one of the processing units and in particular prevents at least one processing step if there is no coating on the front and/or rear end section of the work piece to be processed.

2. The processing machine according to claim 1, wherein the evaluation unit is furthermore designed such that, in the event that there is a coating on the front and/or rear end section of the work piece to be processed, it determines the material thickness of the corresponding coating from the detection results and provides the control device with the material thickness determined, and the control device is furthermore designed such that it controls the further processing of the work piece to be processed by the processing device based on the material thickness determined.

3. The processing machine according to claim 1, wherein the evaluation unit is furthermore designed such that, in the event that there is a coating on the front and/or rear end section of the work piece to be processed, it determines further parameters of the corresponding coating from the detection results and provides the control device with them, and the control device is furthermore designed such that it controls the further processing of the work piece to be processed by the processing device based on the further parameters.

4. The processing machine according to claim 3, wherein the further parameters include the transition radii from the coating to the work piece to be processed and/or the transition bevels from the coating to the work piece to be processed and/or the thickness of the work piece to be processed.

5. The processing machine according to claim 3, wherein the evaluation unit is furthermore designed such that, if there is a coating on the front and/or rear end section of the work piece to be processed, it determines the material thickness for the corresponding coating, compares the material thickness determined with a predefined threshold value, and only determines the further parameters for the corresponding coating if the threshold value is exceeded by the material thickness of the corresponding coating.

6. The processing machine according to claim 1, wherein the processing device comprises multiple processing units, the evaluation unit is furthermore designed such that, in the event that there is a coating on the front and/or rear end section of the work piece to be processed, it determines the material thickness of the corresponding coating and compares the material thickness determined with a predefined threshold value, and the control device is furthermore designed such that it controls the further processing such that it controls at least one processing step by at least one of the processing units and in particular prevents at least one processing step if the material thickness of the corresponding coating on the front and/or rear end section falls below the threshold value.

7. The processing machine according to claim 1, wherein the optical detection device is arranged such that it detects the front and/or rear end section of the work piece to be processed in a projection on a plane which is substantially parallel to the machining direction and vertical to at least one main surface of the work piece to be processed.

8. The processing machine according to claim 1, furthermore with a conveyor system for conveying the work piece to be processed in a conveying direction, wherein the conveying direction is parallel to the machining direction;

the work piece is conveyed with continuous processing; and the conveying speed is less than 200 m/min.

9. The processing machine according to claim 8, wherein the conveying speed is between 15 m/min and 50 m/min.

10. The processing machine according to claim 1, wherein the optical detection device has:

two or more sensing devices which are arranged one after another in the machining direction, and/or one or more pairs of optical sensing devices which are arranged opposite one another in pairs over the work piece to be processed in a direction vertical to the machining direction.

11. The processing machine according to claim 1, wherein the optical detection system is an imaging system.

12. The processing machine according to claim 1, further comprising:

a sensor device which is designed such that the position data for the work piece to be processed is detected and the corresponding position detection results are provided to the control device, wherein the processing machine is designed such that the optical detection of the front and rear end sections of the work piece to be processed by the optical detection device is activated based on the position detection results.

13. The processing machine according to claim 1, wherein the evaluation unit is integrated into the optical detection device or the control device.

14. A method for processing substantially plate-shaped work pieces which are made at least partially from a group consisting of wood, wood materials, composite materials and plastic, the method using a processing machine which has an optical sensing device and a processing device for processing a work piece in a machining direction, wherein the method comprises the following steps:

optical detection of the front and rear end sections of the work piece to be processed in the machining direction for the generation of corresponding detection results using the optical detection device;

evaluation of whether there is a coating on the front and rear end sections of the work piece for the generation of corresponding analysis results, wherein the evaluation occurs through analysis of the detection results;

control of the further processing of the work piece by the processing device based on the analysis results;

determination of the material thickness of the coating on the front and/or rear end section of the work piece to be processed through analysis of the detection results if the presence of a coating on the corresponding end section of the work piece to be processed was identified during the evaluation step;

control of the further processing of the work piece by the processing device based on the material thickness determined;

comparison of the material thickness determined with a predefined threshold value; and if the material thickness determined exceeds the predefined threshold value;

determination of further parameters for the corresponding coating through evaluation of the detection results; and
control of the further processing of the work piece by the processing device based on the further parameters.

15. The method according to claim 14, wherein processing of the work pieces occurs with continuous processing at a conveying speed of less than 200 m/min.

16. The method according to claim 15, wherein the conveying speed is between 15 m/min and 50 m/min.

17. The method according to claim 14, wherein
the optical detection of the front and rear end sections of the work piece to be processed occurs in a projection on a plane which is substantially parallel to the machining direction and vertical to at least on main surface of the work piece to be processed.

* * * * *